United States Patent [19]

Hori et al.

[11] 4,435,751

[45] Mar. 6, 1984

[54] VIBRATION/NOISE REDUCTION DEVICE FOR ELECTRICAL APPARATUS

[75] Inventors: Yasuro Hori, Katsuta; Minoru Kanoi, Ibaraki; Kazuyuki Seino; Syuya Hagiwara, both of Hitachi, all of Japan

[73] Assignee: Hitachi, Ltd., Tokyo, Japan

[21] Appl. No.: 279,814

[22] Filed: Jul. 2, 1981

[30] Foreign Application Priority Data

Jul. 3, 1980 [JP] Japan ................................ 55-89979

[51] Int. Cl.$^3$ ............................................ H04B 15/00

[52] U.S. Cl. .................................... 364/574; 364/576; 375/58

[58] Field of Search ............... 364/574, 576, 726, 572, 364/724; 375/57, 58; 324/77 R, 77 A, 77 B, 83 R

[56] References Cited

U.S. PATENT DOCUMENTS 3,710,082 1/1973 Sloane et al. ....................... 364/576
4,025,724 5/1977 Davidson, Jr. et al. ............ 364/574
4,067,060 1/1978 Poussart et al. .................... 364/576
4,194,183 3/1980 Neuner et al. ...................... 364/574

*Primary Examiner*—Gary Chin
*Attorney, Agent, or Firm*—Antonelli, Terry & Wands

[57] ABSTRACT

A vibration/noise reducing device for applying contrary vibrations/sound waves whose phases are substantially opposite to vibrations/noises generated from an electrical apparatus is disclosed, in which the vibrations/noises from the electrical apparatus are sensed by a sensor, the sensed analog time-domain signal is A/D converted, the resulting digital time-domain signal is then Fourier-transformed, the resulting Fourier-transformed digital frequency-domain signal is modified in its amplitude/phase to produce a second digital frequency-domain signal for generating a vibration/noise reducing control signal, the second digital-frequency-domain signal is inverse-Fourier-transformed, the resulting inverse-Fourier transformed second digital time-domain signal is D/A converted, and the resulting analog time-domain signal is used as the control signal to generate the contrary vibration/sound waves to be applied to the vibrations/noises.

33 Claims, 13 Drawing Figures

VIBRATION/NOISE REDUCTION DEVICE FOR ELECTRICAL APPARATUS

The present invention relates to a device for reducing vibrations and/or noises resulting from the vibrations of an electrical apparatus such as stationary induction apparatus e.g. a reactor or such as a rotary machine e.g. a motor.

Since electricity is used in the aforementioned apparatus as an energy source, vibrations and noises are generated due to electromagnetic forces. In the past, in order to prevent the vibrations and the noises, a damping material was attached to the surface of the electrical apparatus or the electrical apparatus was surrounded by a sound barrier wall. However, those methods had limitations in the amount of reduction vibrations and noises which could be affected. In addition, those methods have increased the overall size of the apparatus.

It has been proposed to reduce the vibrations and/or noises caused by the vibrations by applying thereto other vibrations and/or sound waves which are of substantially opposite phase to the vibrations and/or the resulting noises of the electrical apparatus. (For example, see Japanese Patent Publication No. 417/1958.) Since the vibrations and/or sound waves for reducing vibrations/noises were generated by analog means in the prior art, a vibration/noise reducing system, band pass filters, phase shifters and amplitude controllers were required, one set for each frequency component of the vibrations and/or the noises to be reduced. As a result, a complicated circuit configuration was required to attain high accuracy and the respective sets of phase shifters and amplitude controllers had to be adjusted manually with very troublesome work. In addition, since the analog band pass filters did not provide high resolution for frequency, control accuracy was poor. Consequently, this method has not been put into practice.

It is an object of the present invention to provide a vibration/sound reducing device for an electrical apparatus which overcomes the problems encountered in the prior art systems, which is simple in circuit configuration, which is easy to adjust and which may be controlled with high accuracy to effectively reduce the vibrations and/or the noises resulting from the vibrations.

In order to attain the above object, according to the present invention, there is provided a device for reducing vibrations generated in an electrical apparatus or noises resulting from said vibrations, comprising a sensor for sensing the vibrations or the resulting noises to produce a first analog time-domain signal, an analog-to-digital converter for converting the first analog time-domain signal to a corresponding first digital time-domain signal, a Fourier transformation circuit for Fourier transforming the digital time-domain signal to a corresponding first digital frequency-domain signal, a control circuit for producing a second digital time-domain signal based on the first digital frequency-domain signal, an inverse Fourier transformation circuit for inverse Fourier transforming the second digital frequency-domain signal to a corresponding second digital time-domain signal, a digital-to-analog converter for converting the second digital time-domain signal to a corresponding second analog time domain signal, an amplifier for amplifying the second analog time-domain signal, and a vibration applying device actuated by the amplified second analog time-domain signal to apply vibration-reducing vibrations to the electrical apparatus or a sound speaker for generating noise reducing sound waves.

Other objects and features of the present invention will be apparent from the preferred embodiments of the present invention taken in conjunction with the accompanying drawings, in which:

FIG. 1 shows a block diagram of one embodiment of the present invention;

FIGS. *2a* to *2f* show signal waveforms at various points in the embodiment of FIG. 1;

Figure 1:
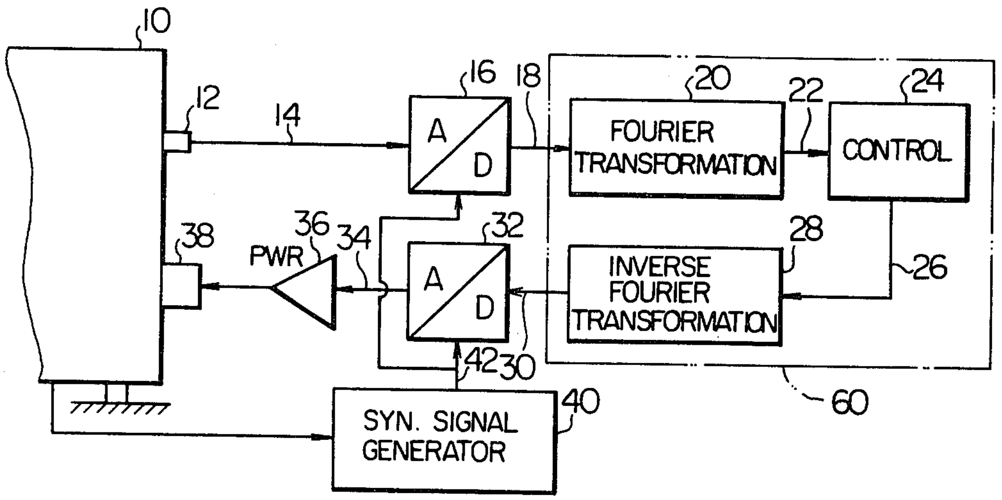
Figure 2A:
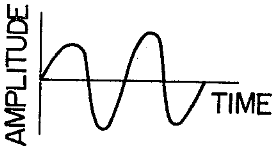
Figure 2B:
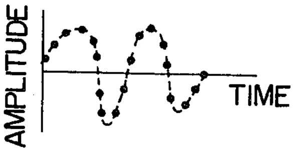
Figure 2C:
Figure 2D:
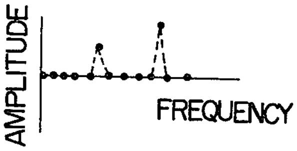
Figure 2E:
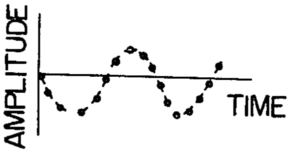
Figure 2F:
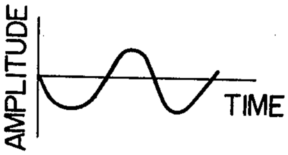

Referring now to FIG. 1, an embodiment of the present invention is explained. In FIG. 1, vibrations generated by an electrical apparatus 10 such as a transformer is sensed by a vibration sensor 12 which produces an analog signal 14 the amplitude of which varies with time (hereinafter referred to as an analog time-domain signal). The analog time-domain signal 14 from the vibration sensor is converted by an analog-to-digital (A/D) converter 16 to a digital signal 18 the amplitude of which varies with time (hereinafter referred to as a digital time-domain signal). The digital time-domain signal 18 is then subject to Fourier transformation by a Fourier transformation circuit 20 to a digital signal 22 having an amplitude which varies with frequencies (hereinafter referred to as a digital frequency-domain signal). Since the digital frequency-domain signal 22 represents amplitudes and phases of frequency components of the vibrations generated in the electrical apparatus 10, a control circuit 24 determines the amplitudes and the phases of the frequency components such that the amplitudes of the frequency components are reduced, and the resulting signals are applied to an inverse Fourier transformation circuit 28 as a vibration reducing digital frequency-domain signal 26. The digital frequency-domain signal 26 is subject to inverse Fourier transformation by the inverse Fourier transformation circuit 28 to a digital time-domain signal 30, which is converted by a digital-to-analog (D/A) converter 32 to an analog time-domain signal 34, which in turn is amplified by a power amplifier 36. The output of the power amplifier 36 is supplied to a vibration applying device 38 to actuate it. In response to the actuation by the amplified analog time-domain signal, the vibration applying device 38 generates vibrations for reducing the amplitudes of the frequency components of the vibrations generated by the electrical apparatus 10. The thus generated vibrations are then applied to the electrical apparatus 10 to reduce the vibrations of the electrical apparatus 10. The control circuit 24 changes the amplitude and the phase of the vibration reducing digital frequency-domain signal 26 such that the vibrations of the electrical apparatus 10 are minimized. The sampling operations of the A/D converter 16 and the D/A converter 32 are controlled by a synchronizing signal 42 generated by a synchronizing signal generator 40. In the case where the electrical apparatus 10 is a transformer, for example, the frequency of the vibration is an integer multiple of a power supply frequency. Accordingly, the synchronizing signal generator 40 receives the power supply frequency of the electrical apparatus 10 to generate the synchronizing signal of a frequency which is an integer multiple of the power supply frequency.

FIGS. 2*a* to 2*f* show waveforms of signals at various points in the vibration reducing apparatus shown in FIG. 1, that is, the waveforms of the analog time-domain signal 14, the digital time-domain signal 18, the digital frequency-domain signal 22, the digital frequency-domain signal 26, the digital time-domain signal 30 and the analog time-domain signal 34 respectively. The control circuit 24 responds to the change in the amplitudes of the frequency components of the digital frequency-domain signal 22 (FIG. 2*c*) applied thereto to vary the amplitude and the phase of the digital frequency signal 26 produced thereby such that the amplitude of the signal 22 is minimized.

Figure 3:
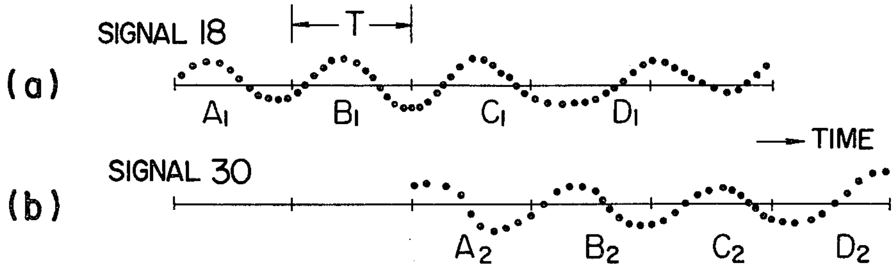
FIG. 3 illustrates input and output signals of a Fourier transformation circuit.

FIG. 3 shows a relationship between the digital time-domain signal 18 (FIG. 2*b*) produced by the A/D converter 16, that is, the input signal to the Fourier transformation circuit 20 and the digital time-domain signal 30 (FIG. 2*e*) applied to the D/A converter 32, that is, the output signal from the inverse Fourier transformation circuit 28. The $2^n$ (where n is a positive integer) input signals 18 (FIG. 2*b*) per time interval T are sampled and data in a section $A_1$ are processed within the time interval T of the next sequential section $B_1$ by the Fourier transformation circuit 20, the control circuit 24 and the inverse Fourier transformation circuit 28 and the output signal 30 (FIG. 2*e*) is produced in an output signal time section $A_2$ which corresponds to the next sequential section $C_1$ of the section $B_1$. Similarly, the data in the sections $B_1$, $C_1$, $D_1$, . . . for the input signal 18 (FIG. 2*b*) are processed to produce the output signal 30 in the sections $B_2$, $C_2$, $D_2$, . . . , respectively. The signals are applied to and produced from the Fourier transformation circuit 20, the control circuit 24 and the inverse Fourier transformation circuit 28 in a continuous manner without a gap of data. The data in one T-time period is called a frame. A T-processing time is allowed for one frame of data. The Fourier transformation, the conversion to the vibration reducing digital frequency-domain signal, the averaging process and the inverse Fourier transformation are carried out within the T-processing time.

Since frequency resolution $\Delta f$ of the Fourier transformation is equal to 1/T, the resolution $\Delta f$ is equal to 1 Hz when T is equal to one second. It has been very difficult to attain such high resolution by conventional analog frequency filters.

The present embodiment presents the following advantages:

(1) Since only one common set of an A/D converter, a Fourier transformation circuit, a control circuit, an inverse Fourier transformation circuit and a D/A converter is needed for the respective frequency components of the vibrations to be reduced, the circuit configuration of the apparatus is very much simplified and a control range thereof is expanded. As a result, a stable control for reducing the vibrations is attained and adjustment work is facilitated.

(2) Since high frequency resolution is attained, control accuracy for reducing the vibrations is enhanced.

(3) Since the sampling operations are in synchronism with the vibration frequency, calculation accuracy for the amplitude and the phase is enhanced and electrical noises are eliminated by the averaging process so that the control accuracy for reducing vibrations is further enhanced.

Figure 4:
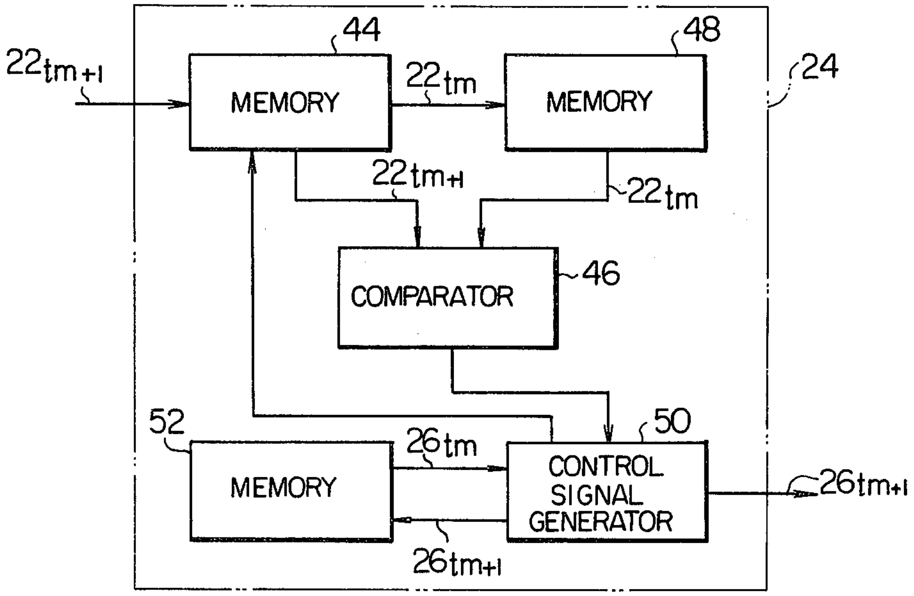
FIG. 4 shows a block diagram of another embodiment of the present invention.

FIG. 4 shows a block diagram of the control circuit 24. Referring to FIG. 4, the operation of the control circuit 24 is explained in detail. In the following description, suffixes $t_n$ (n=1, 2, . . . , m, m+1, . . . ) of the reference numerals for the signals represent respective time sections.

The digital time-domain signal 18 produced by the A/D converter 16 is fed serially in time as shown in FIG. 3(*a*) and applied to the Fourier transformation circuit 20. It is processed in each of the time sections in the following manner. The digital time-domain signal portion $\mathbf{18}_{t1}$ which is A/D-converted in the time section $t_1$ is processed in the next time section $t_2$ as follows. The signal portion $\mathbf{18}_{t1}$ is Fourier-transformed by the Fourier transformation circuit 20 to produce a digital frequency-domain signal portion $\mathbf{22}_{t1}$. That is, a Fourier-transformed data of the time section $t_1$ is applied to a first memory 44 so as to be stored therein and also to be applied to a comparator 46. The comparator 46 compares the amplitude and the phase of the Fourier-transformed data with those of a Fourier-transformed data of the immediately preceding time section which is stored in a second memory 48 and is supplied therefrom. For the Fourier-transformed data $\mathbf{22}_{t1}$ of the first time section $t_1$, the Fourier-transformed data of the preceding time section to be compared has not been stored in the second memory 48 and hence no comparison takes place. Thus, the comparator 46 sends a signal representing that the applied data is the Fourier-transformed data of the time section t1 to a control signal generator 50, which responds to that signal from the comparator 46 to read out an initial control signal previously stored in a third memory 52 as a digital frequency-domain signal portion $\mathbf{26}_{t1}$, which is then applied to the inverse Fourier transformation circuit 28 and also stored in the third memory 52 as a control signal produced correspondingly to the time section $t_1$. The inverse Fourier transformation circuit 28 inverse-Fourier-transforms the digital frequency-domain signal portion $\mathbf{26}_{t1}$ to produce a digital time-domain signal portion $\mathbf{30}_{t1}$. The time section $t_2$ extends from the start of the application of the digital time-domain signal portion $\mathbf{18}_{t1}$ to the Fourier transformation circuit 20 to the start of the application of the digital time-domain signal portion $\mathbf{30}_{t1}$ to the D/A converter 32. Within the time section $t_2$, the digital frequency-domain signal portion $\mathbf{22}_{t1}$ is also transferred from the first memory 44 to the second memory 48. In the next time section $t_3$, the digital frequency-domain signal portion $\mathbf{22}_{t2}$, derived by Fourier-transforming by the Fourier transformation circuit 20 of the digital time-domain signal portion $\mathbf{18}_{t2}$ which was converted by the A/D converter 16 in the time section $t_2$, is supplied to the first memory 44 so as to be stored therein and also to be applied to the comparator 46 as a current Fourier-transformed data. The Fourier-transformed data of the previous time section stored in the second memory 48 is also applied to the comparator 46, which compares the amplitudes and the phases of those two data. If the comparison result indicates the increase (or decrease) of vibration, a signal representing the result is sent to the control signal generator 50, which, based on that signal, changes the amplitude and the phase of the control signal portion $\mathbf{26}_{t1}$ of the previous time section which has been stored in the third memory 52 and is to be supplied therefrom by predetermined small magnitudes in the direction of decreasing the vibration. The resulting control signal portion is sent to the inverse Fourier transformation circuit 28 as a current control signal portion $26_{t2}$ and is also stored in the third memory 52. The digital frequency-domain signal portion $26_{t2}$ is inverse-Fourier-transformed to produce a digital time-domain signal portion $30_{t2}$. The signal processing thus far is carried out in the time section $t_3$. In the time section $t_3$, the Fourier-transformed data $22_{t2}$ stored in the first memory 44 is sent to the second memory 48 and stored therein.

The signal processing thus far described may be described in a general form as follows. If it is determined that the vibration is increasing in the time section $t_{m+1}$ as a result of the increase of the amplitude (and/or phase) of the control signal $26t_{m-1}$ in the time section $t_m$ to produce the control signal 26 $t_m$, the amplitude (and/or phase) of the previous control signal $26t_m$ is decreased to produce the current control signal $26t_{m+1}$. Conversely, if it is determined that the vibration is decreasing in the time section $t_{m+1}$, as a result of the decrease of the amplitude (and/or phase) of the previous control signal $26t_{m-1}$ in the time section $t_m$ to produce the control signal $26t_m$, the amplitude (and/or phase) of the previous control signal $26t_m$ is increased.

In this manner, the control signal $26t_n$ is produced in each time section and the contents of the second and third memories are updated each time.

In the present embodiment, since the A/D converter 16 and the D/A converter 32 effect their sampling operation in response to the synchronizing signal which has the frequency equal to the integer multiple of the power supply frequency and is generated by the synchronizing signal generator 40, the digital frequency-domain signal 22 shown in FIG. *2c* includes no leakage phenomenon which would appear when the integer multiple of the signal does not coincide with the sampling frequency. When such leakage phenomenon occurs, a number of frequency components would appear in FIG. *2c* in spite of the fact that only one frequency component is present and hence reading accuracy of the amplitude and phase would be lowered. In the present embodiment, since no such leakage phenomena occurs, the reading accuracy of the amplitude and phase is improved. In addition, by averaging the signals shown in FIGS. *2b* and *2c*, the frequency components which are not related to the power supply frequency, that is, external noises are substantially reduced so that the control accuracy is further enhanced.

Figure 5:
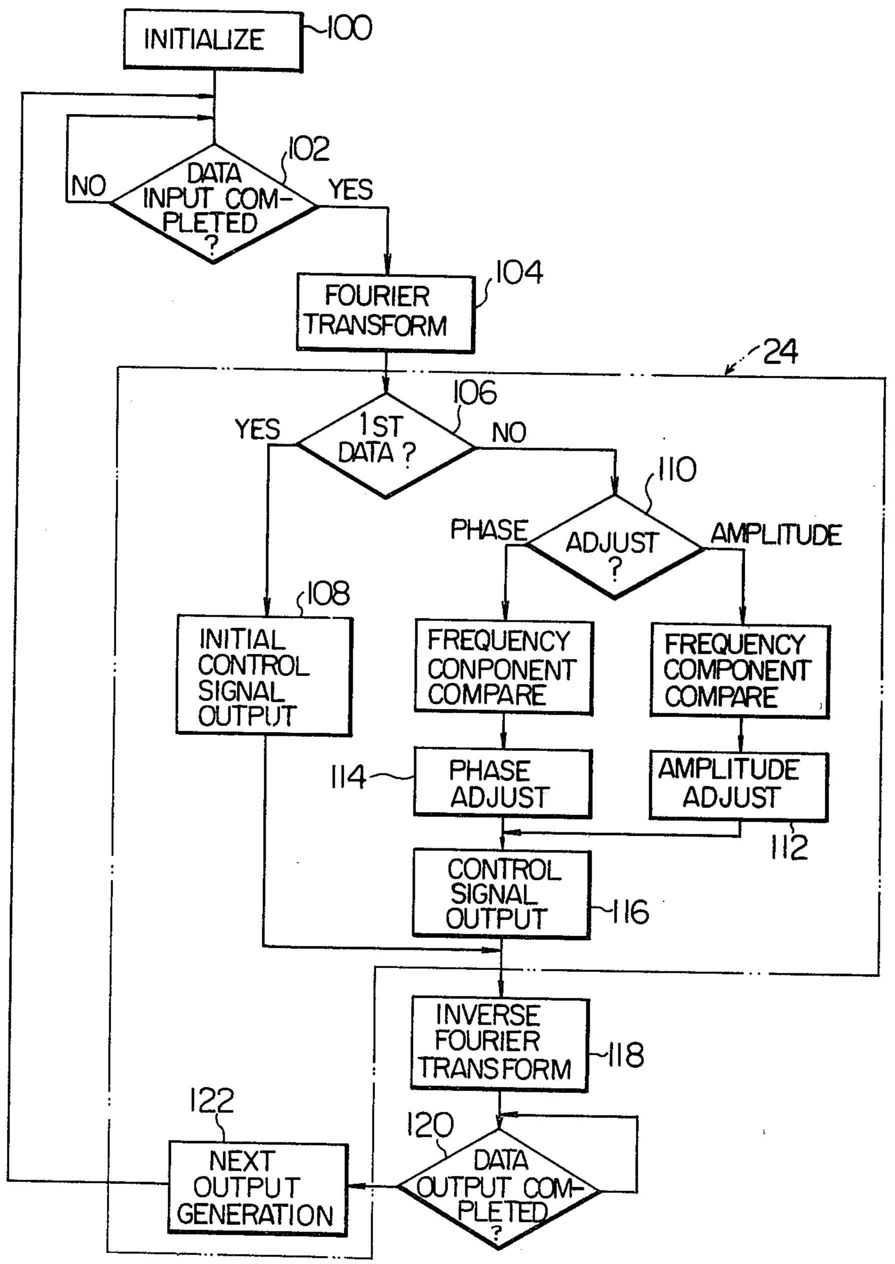
FIG. 5 shows a flow chart of a further embodiment of the present invention.

In the embodiment shown in FIG. 1, a block 60 encircled by a dotted line, that is, the Fourier transformation circuit 20, the control circuit 24 and the inverse Fourier transformation circuit 28 may be constituted by a microcomputer. The operation thereof is illustrated in a flow chart of FIG. 5.

First, the system is initialized (step 100), and the output or the digital time-domain signal 18 of the A/D converter 16 is read in (step 102). The read-in data 18 is Fourier-transformed to the digital frequency-domain signal 22 (step 104) which is examined to determine if it is the data of the first time section (step 106). If the decision is "YES", the previously stored initial control signal is produced as the vibration reducing digital frequency-domain signal 26 (step 108). If the decision at the step 106 is "NO", the digital frequency-domain signal 22 is compared with the digital frequency-domain signal 22 which was read, Fourier-transformed and stored in the previous time section to determine the necessity of adjustment of the amplitude/phase of the control signal 26 which as produced and stored in the previous time section (step 110). After the amplitude/-phase are adjusted (step 112 and 114), a new control signal 26 is produced (step 116). The control signal 26 produced at the step 108 or 116 is inverse-Fourier-transformed to the digital time-domain signal 30 (step 118) and read into the D/A converter 32 (step 120). After the read-in, an instruction to generate the next output data is issued (step 122).

Figure 6:
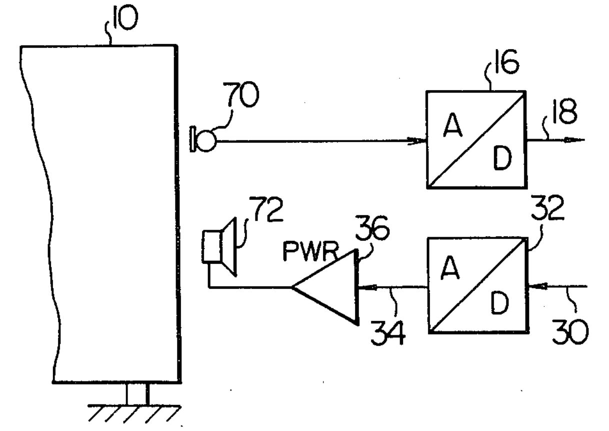
FIGS. 6 to 8 show block diagrams of a still further embodiment of the present invention.

While the present invention is intended to reduce the vibrations per se, the noises resulting from the vibrations may be reduced. In that case, the vibration sensor 12 and the vibration applying device 38 shown in FIG. 1 are substituted by a noise sensor (microphone) 70 and a speaker 72 shown in FIG. 6 so that a noise reducing sound wave generated by the speaker 72 interferes with the noise to reduce it.

Although not shown, the vibration sensor 12 shown in FIG. 1 may be left and only the vibration applying device 38 may be substituted by the speaker 72 to reduce the noise. Conversely, the vibration applying device 38 shown in FIG. 1 may be left and only the vibration sensor 12 may be substituted by the noise sensor (microphone) 70 to reduce the vibration.

By arranging a number of vibration applying devices 38 and/or the speakers 72 instead of one as shown in the illustrated embodiment, the vibrations and/or the noises can be more effectively reduced.

Figure 7:
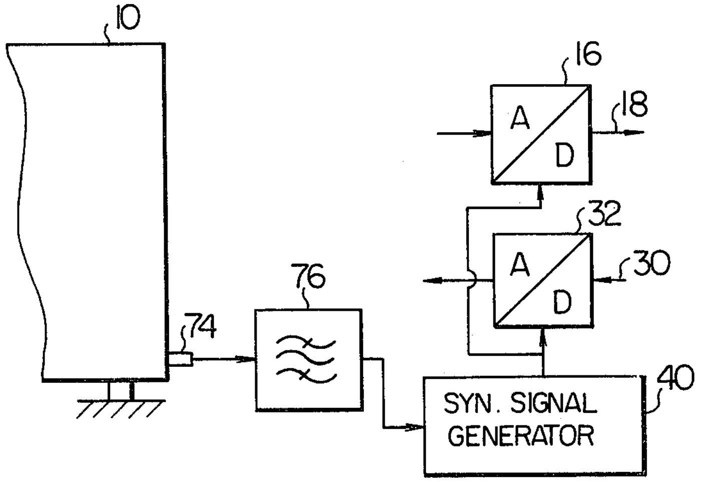
Figure 8:
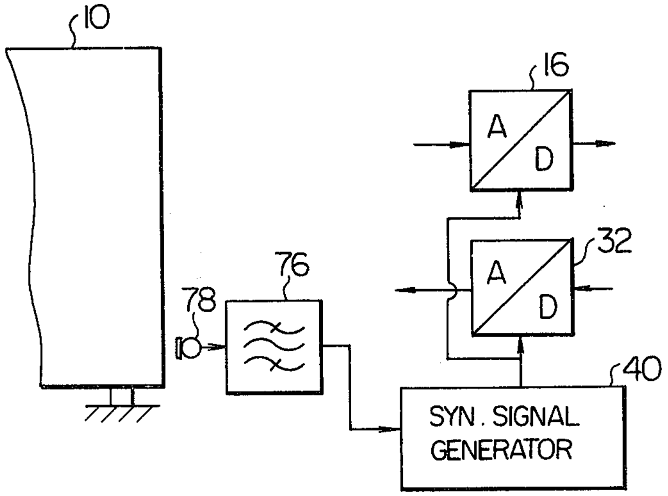

When the electrical apparatus 10 is a motor or the like, the frequency of vibration is not always equal to an integer multiple of the power supply frequency. In this case, the power supply frequency is not used as the input to the synchronizing signal generator 40 but, as shown in FIG. 7, the signal sensed by a vibration sensor 74 is passed through a frequency filter 76 to separate the frequency. When the noise is to be reduced, a noise sensor (microphone) 78 may be used instead of the vibration sensor 74. While the vibration sensor 74 or the noise sensor 78 is shown to be separately arranged from the sensor 12 or 38 shown in FIG. 1, it should be understood that the sensor 74 or 78 may not be separately arranged but the output of the sensor 12 or 38 may be applied to the frequency filter 76.

We claim:

1. A device for reducing vibrations of an electrical apparatus comprising;

sensor means for sensing said vibrations generated by said electrical apparatus to produce a first analog time-domain signal, analog-to-digital converter means for converting said first analog time-domain signal to a corresponding first digital time-domain signal, Fourier transformation means for Fourier-transforming said digital time-domain signal to produce a first digital frequency-domain signal, control means responsive to said first digital frequency-domain signal to produce a vibration-reducing second digital frequency-domain signal, said control means including first, second and third memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for inverse-Fourier-transforming said second digital frequency-domain signal to produce a second digital time-domain signal, digital-to-analog converter means for converting said second digital time-domain signal to a corresponding second analog time-domain signal, means for amplifying said second analog time-domain signal, and applying vibrations corresponding to said amplified second analog time-domain signal to said electrical apparatus.

2. A device for reducing noises resulting from vibrations of an electrical apparatus comprising;

sensor means for sensing the vibrations generated by said electrical apparatus to produce a first analog time-domain signal, analog-to-digital converter means for converting said first analog time-domain signal to a corresponding first digital time-domain signal, Fourier transformation means for Fourier-transforming said first digital time-domain signal to produce a first digital frequency-domain signal, control means responsive to said first digital frequency-domain signal to produce a vibration-reducing second digital frequency-domain signal, said control means including first, second and third memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for inverse-Fourier-transforming said second digital frequency-domain signal to produce a second digital time-domain signal, digital-to-analog converter means for converting said second digital time-domain signal to a corresponding second analog time-domain signal, means for amplifying said second analog time-domain signal, and speaker means responsive to said amplifying means to be actuated by the amplified second analog time-domain signal to produce noise-reducing sound waves of substantially opposite phase to said noises and to cause said sound waves to interfere with said noises.

3. A device for reducing vibrations of an electrical apparatus comprising;

sensor means for sensing noises resulting from said vibrations generated by said electrical apparatus to produce a first analog time-domain signal, analog-to-digital converter means for converting said first analog time-domain signal to a corresponding first digital time-domain signal, Fourier transformation means for Fourier-transforming said first digital time-domain signal to produce a first digital frequency-domain signal, control means responsive to said first digital frequency-domain signal to produce a vibration-reducing second digital frequency-domain signal, said control means including first, second and third memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for inverse-Fourier-transforming said second digital frequency-domain signal to produce a second digital time-domain signal, digital-to-analog converter means for converting said second digital time-domain signal to a corresponding second analog time-domain signal, means for amplifying said second analog time-domain signal, and applying vibrations corresponding to said amplified second analog time-domain signals to said electrical apparatus.

4. A device for reducing noises resulting from vibrations of an electrical apparatus comprising;

sensor means for sensing the noises resulting from said vibrations generated by said electrical apparatus to produce a first analog time-domain signal, analog-to-digital converter means for converting said first analog time-domain signal to a corresponding first digital time-domain signal, Fourier transformation means for Fourier-transforming said first digital time-domain signal to produce a first digital time-domain signal to produce a first digital frequency-domain signal, control means responsive to said first digital frequency-domain signal to produce a vibration-reducing second digital frequency-domain signal, said control means including first, second and third memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for inverse-Fourier-transforming said second digital frequency-domain signal to produce a second digital time-domain signal, digital-to-analog converter means for converting said second digital time-domain signal to a corresponding second analog time-domain signal, means for amplifying said second analog time-domain signal, and speaker means responsive to said amplifying means to be actuated by the amplified second analog time-domain signal to generate sound waves of substantially opposite phase to said noises and to cause said sound waves to interfere with said noises.

5. A device according to claim 1, 2, 3 or 4 wherein said third memory means previously stores a portion of second digital frequency-domain signal as an initial control signal portion to be initially supplied from said control signal generating means upon the start of said device.

6. A device according to claim 1, 2, 3 or 4, wherein said fourier transformation means, said control means and said inverse Fourier transformation means are constituted by a microcomputer.

7. A device according to claim 1, 2, 3 or 4, wherein said Fourier transformation means, said first, second and third memory means, said compare means and said control signal generating means are constituted by a microcomputer.

8. A device according to claim 1, 2, 3 or 4, further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

9. A device according to claim 1, 2, 3 or 4, further comprising synchronizing signal generating means which receives a power supply frequency of said electrical apparatus as an input thereto to generate a synchronizing signal having a frequency equal to an interger multiple of said power supply frequency, the sampling of said analog-to-digital converter means and said digital-to-analog converter means being controlled by said synchronizing signal.

10. A device according to claim 5 further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

11. A device according to claim 6 further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

12. A device according to claim 7 further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

13. A device according to claim 1, 2, 3 or 4 further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

14. A device according to claim 5 further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

15. A device according to claim 6 further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

16. A device according to claim 7 further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

17. A device for reducing vibration of an electrical apparatus comprising;

sensor means for sensing vibrations generated by said electrical apparatus to produce a first analog time-domain signal whose instantaneous value represents an instantaneous amplitude of the vibration, analog-to-digital converter means for converting said first analog time-domain signal to a corresponding first digital time-domain signal, Fourier transformation means for successively Fourier-transforming divided sections of said first digital time-domain signal, each section having a period of a predetermined time interval, to produce first digital frequency-domain signals successively with said time interval, means for producing second digital frequency-domain signal, successively, with said time interval, as a function of two successive first digital frequency-domain signals produced by said Fourier transformation means, said means for producing second digital frequency-domain signals including first, second and their memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for successively inverse-Fourier-transforming such second digital frequency-domain signals to produce second digital time-domain signals, successively, with said time interval, digital-to-analog converter means for converting said second digital time-domain signals to corresponding second analog time-domain signals, each having a period of said time interval, and means for amplifying said second analog time-domain signals, and applying vibrations corresponding to said amplified second analog time-domain signals to said electrical apparatus.

18. A device according to claim 17, wherein said third memory means previously stores a portion of the second digital frequency-domain signal as an initial control signal portion to be initially supplied from said control signal generating means upon the start of said device.

19. A device according to claim 17, wherein said Fourier transformation means, said control means and said inverse Fourier transformation means are constituted by a microcomputer.

20. A device according to claim 17, wherein said Fourier transformation means, said first, second and third memory means, said compare means and said control signal generating means are constituted by a microcomputer.

21. A device according to claim 17, further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

22. A device according to claim 18, further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

23. A device according to claim 19, further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

24. A device according to claim 20, further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

25. A device according to claim 17, further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

26. A device according to claim 18, further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

27. A device according to claim 19, further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

28. A device according to claim 20, further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling of said analog-to-digital converter means and said digital-to-analog converter means being controlled by said synchronizing signal.

29. A device for reducing noises resulting from vibrations of an electrical apparatus comprising;

sensor means for sensing the vibrations generated by said electrical apparatus to produce a first analog time-domain signal, analog-to-digital converter means for converting said first analog time-domain signal to a corresponding first digital time-domain signal, Fourier transformation means for Fourier-transforming said first digital time-domain signal to produce a first digital frequency-domain signal, control means responsive to said first digital frequency-domain signal to produce a vibration-reducing second digital frequency-domain signal, said control means including first, second and third memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for inverse-Fourier-transforming said second digital frequency-domain signal to produce a second digital time-domain signal, digital-to-analog converter means for converting said second digital time-domain signal to a corresponding second analog time-domain signal, means for amplifying said second analog time-domain signal, and speaker means responsive to said amplifying means to be actuated by the amplified second analog time-domain signal to produce noise-reducing sound waves of substantially opposite phase to said noises for application against said noises to cause said sound waves to interfere with said noises.

30. A device according to claim 29, further comprising synchronizing signal generating means which receives a power supply frequency of said electrical apparatus as an input thereto to generate a synchronizing signal having a frequency equal to an integer multiple of said power supply frequency, the sampling of said analog-to-digital converter means and said digital-to-analog converter means being controlled by said synchronizing signal.

31. A device according to claim 29, further comprising frequency filter means for picking up frequency components of said analog time-domain signal and synchronizing signal generating means for receiving the output frequency of said frequency filter means as an input thereto to generate a synchronizing signal having a frequency equal to an integer multiple of said output frequency, the sampling said analog-to-digital converter means and said digital-to-analog converter means being controlled by said synchronizing signal.

32. A device for reducing vibrations of an electrical apparatus comprising;

sensor means for sensing noises generated by said electrical apparatus to produce a first analog time-domain signal, analog-to-digital converter means for converting said first analog time-domain signal to a corresponding first digital time-domain signal, Fourier transformation means for Fourier-transforming said first digital time-domain signal to produce a first digital frequency-domain signal, control means responsive to said first digital frequency-domain signal to produce a vibration-reducing second digital frequency-domain signal, said control means including first, second and third memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for inverse-Fourier-transforming said second digital frequency-domain signal to produce a second digital time-domain signal, digital-to-analog converter means for converting said second digital time-domain signal to a corresponding second analog time-domain signal, means for amplifying said second analog time-domain signal, and applying vibrations corresponding to said amplified second analog time-domain signal to said electrical apparatus.

33. A device for reducing noises resulting from vibrations of an electrical apparatus comprising;

sensor means for sensing noises generated by said electrical apparatus to produce a first analog time-domain signal, analog-to-digital converter means for converting said first analog time-domain signal to a corresponding first digital time-domain signal, Fourier transformation means for Fourier-transforming said first digital time-domain signal to produce a first digital frequency-domain signal, control means responsive to said first digital frequency-domain signal to produce a vibration-reducing second digital frequency-domain signal, said control means including first, second and third memory means, comparing means and control signal generating means, wherein a portion of said first digital frequency-domain signal belonging to a (m+1)th time section of a unit time interval T is applied to said first memory means and stored therein while a portion of said first digital frequency-domain signal belonging to a m-th time section of the unit time period T is stored in said second memory means, wherein said comparing means compares the contents of said first, and second memory means and said control signal generating means responds to the compare result of said comparing means to modify a portion of said second digital frequency-domain signal previously produced based on the previous compare result and stored in said third memory to produce a next portion of said second digital frequency-domain signal, and wherein the contents of said first, second and third memory means are updated each time when said control signal generating means produces said modified second digital frequency-domain signal portion, inverse Fourier transformation means for inverse-Fourier-transforming said second digital frequency-domain signal to produce a second digital time-domain signal, means for amplifying said second analog time-domain signal, and speaker means responsive to said amplifying means to be actuated by the amplified second analog time-domain signal to generate sound waves of substantially opposite phase to said noises for application against said noises to cause said sound waves to interfere with said noises.

* * * * *